P. MAAG.
ANTISKIDDING DEVICE FOR AUTOMOBILES AND THE LIKE.
APPLICATION FILED MAR. 26, 1914.
1,107,430.
Patented Aug. 18, 1914.
2 SHEETS—SHEET 1.
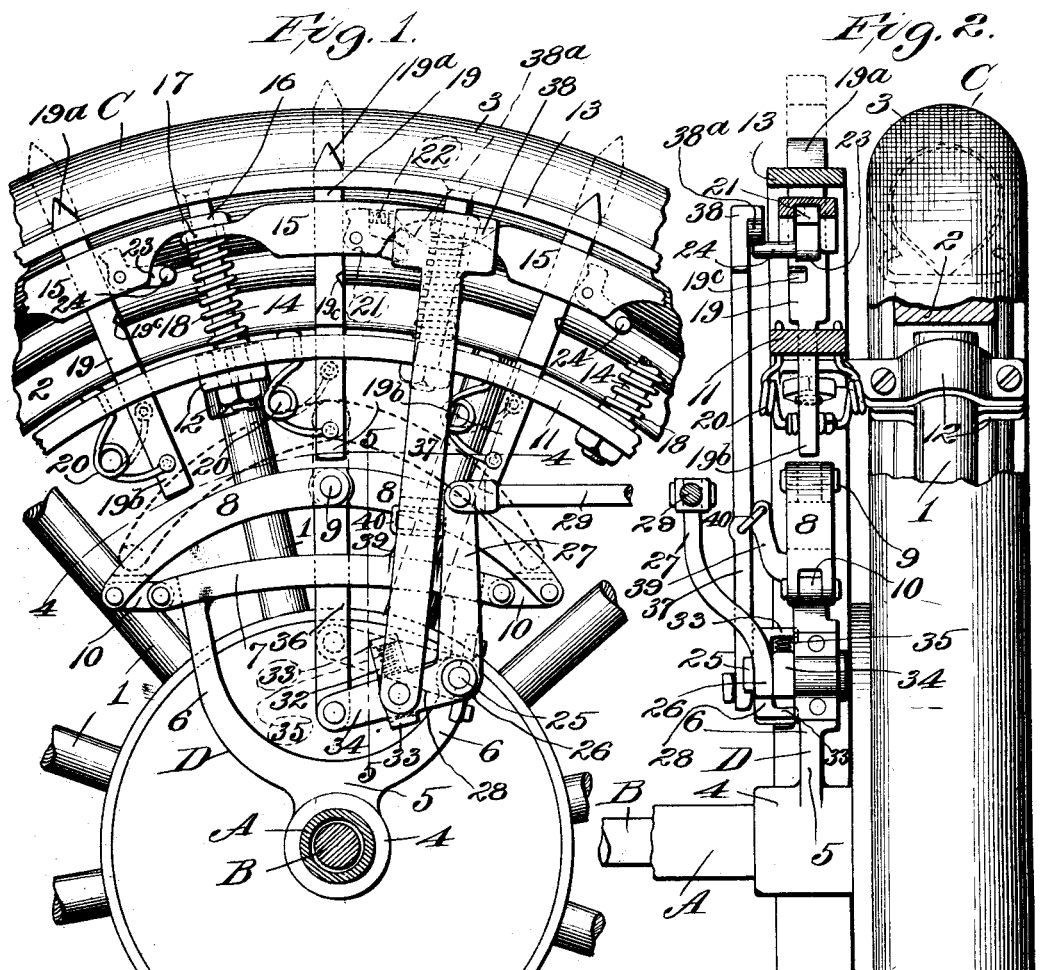
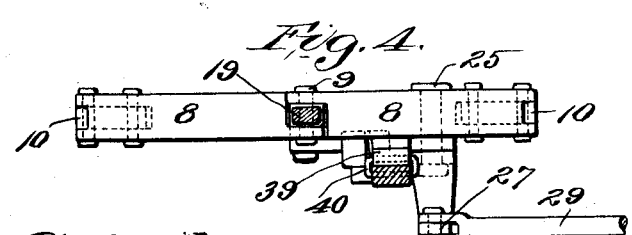
Inventor:
Philip Maag,
by Ralph Trench Atty

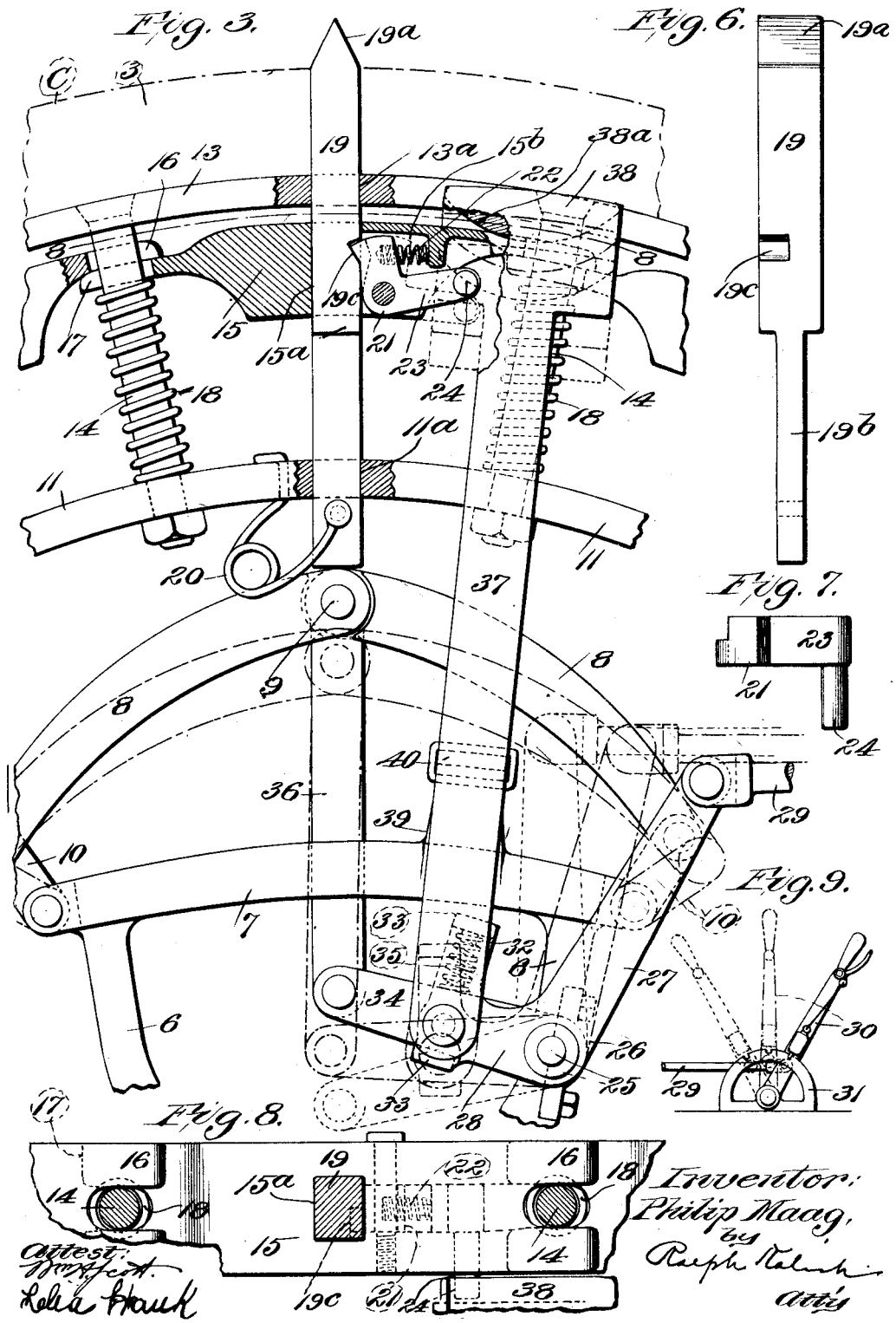

UNITED STATES PATENT OFFICE.

PHILIP MAAG, OF NEAR WEBSTER GROVES, MISSOURI.

ANTISKIDDING DEVICE FOR AUTOMOBILES AND THE LIKE.

1,107,430.   Specification of Letters Patent.   Patented Aug. 18, 1914.

Application filed March 26, 1914. Serial No. 827,372.

*To all whom it may concern:*

Be it known that I, PHILIP MAAG, a citizen of the United States, residing near Webster Groves, in the county of St. Louis, State of Missouri, have invented a certain new and useful Improvement in Antiskidding Devices for Automobiles and the like, of which the following is a specification, reference being had to the accompanying drawings, forming a part hereof, in which—

Figure 1 is a fragmentary view of the inner face of an automobile wheel equipped with my invention, showing my invention in side elevation with parts broken away and with the ground-engaging members or spurs thereof in full lines in normal or retracted position; Fig. 2 is an edge elevational view of the wheel, partly broken away, with parts of my invention in vertical section; Fig. 3 is an enlarged fragmentary view of my invention in side elevation with the wheel omitted, parts thereof being in section and the spurs being in projected or ground-engaging position; Fig. 4 is a plan view, partly in section, on approximately the line 4—4, Fig. 1; Fig. 5 is a detail vertical sectional view on approximately the line 5—5 Fig. 1; Fig. 6 is an enlarged elevational view of one of the spurs or ground-engaging-members; Fig. 7 is an enlarged plan view of one of the spur-locking dogs or pawls; Fig. 8 is a plan view, partly in section, on approximately the line 8—8 Fig. 3; and Fig. 9 is an elevational view of the operating-lever and its sector, showing the same in full, dot-and-dash, and dotted lines in its several positions.

This invention relates to a certain new and useful improvement in anti-skidding devices for automobiles and the like, the object of my invention being to provide an easily operated and efficient device of the kind stated.

With the above and other objects in view, my present invention resides in certain novel features of construction, arrangement, and combination of parts, all as will hereinafter be described and afterward pointed out in the claims.

Referring to the accompanying drawings, in which like reference characters refer to like parts throughout the several views, A indicates the dead or fixed axle, B the live or rotatable axle, and C a wheel of an automobile or other self-propelled vehicle, all said parts being of any suitable or approved construction and wheel C comprising, as is usual, radial spokes 1, a rim 2, and a pneumatic or other suitable preferably resilient tire 3.

Fixed on axle A adjacent the inner face of wheel C is a member, preferably a casting, D comprising preferably integrally a perforated or bored portion 4 encircling axle A, a substantially U-shaped portion 5 having its legs 6—6 presented upwardly, and a preferably somewhat bowed or curved bar-portion 7 extending across the bight of said U-shaped portion 5 at the upper ends, and projecting at its opposite ends slightly beyond the outer side faces, of said upwardly-presented legs 6—6, all as clearly seen in Figs. 1 and 3.

8—8 indicate a pair of curved or arcuate links, seen clearly also in Figs. 1 and 3, which are pivotally connected together at their inner ends by means of a pin or bolt 9 and at their outer ends are pivotally connected to the outer ends of short links 10—10 which, in turn, are pivotally connected at their inner ends to the projecting ends of said bar-portion 7 of member D.

11 indicates a continuous ring-shaped or annular preferably metallic member which is fixed, as by means of co-acting clamping-members or split-collars 12—12, to spokes 1 somewhat inwardly, or within the periphery, of rim 2 and on the inner face of wheel C. Positioned also on the inner face of wheel C, but spaced outwardly from ring or annular member 11, is a second continuous ring-shaped or annular member 13, ring 13 being held in fixed spaced-apart relation to ring 11 by means of radial bolts or the like 14. Arranged in an annular series around wheel C in the space between rings 11 and 13 are similar blocks or members 15, each of said blocks 15 having at one end a longitudinal bifurcated extension 16 loosely fitting on a bolt 14 and overlapping thereupon a correspondingly bifurcated longitudinal extension 17 projecting from the opposite end of the next adjacent block 15, as seen clearly in Figs. 1 and 3. Interposed on bolts 14 between said overlapping extensions 16 and 17 of blocks 15 and said inner fixed ring 11 are coiled springs or resilient members 18, whereby the blocks 15, while normally resiliently held or supported in an annular series adjacent the inner face of outer ring 13, are free to severally or independently give or yield radially inwardly toward axle A for purposes hereinafter appearing. Each of said blocks 15 is centrally transversely provided with a radial opening 15ᵃ, rings 11 and 13 being correspondingly provided with registering radial openings 11ᵃ and 13ᵃ, respectively; and arranged in a radial series around wheel C, and each radially slidably movable in a set of said registering openings 11ᵃ, 13ᵃ, and 15ᵃ, are ground-engaging-members or spurs 19 preferably corresponding in number to the number of said blocks 15. As shown clearly in Fig. 6, these spurs 19 at their outer ends are preferably sharpened, as at 19ᵃ, and at their inner ends are preferably reduced in thickness, as at 19ᵇ. Each spur 19 is preferably yieldingly maintained in normal retracted position, or in the position thereof shown in full lines in Fig. 1, with its sharpened end 19ᵃ within the periphery or tread-portion of tire 3, by means of a spring or resilient member 20, spring or member 20 having one end suitably fixed to the reduced end 19ᵇ of the spur 19 and its opposite end to inner ring 11. At one side, as clearly seen in Fig. 3, each block 15 is interiorly cut-away or recessed, as at 15ᵇ, in which is pivoted a pawl or dog 21 adapted, when the spur 19 slidable in the said block 15 has been projected by the means hereinafter described into outer or ground-engaging position, or into the position thereof shown in dotted lines in Fig. 1 and in full lines in Fig. 3, to engage under the tension of a small coiled spring 22, seen clearly in Fig. 3, with a notch or recess 19ᶜ provided in the adjacent face of the spur 19 to releasably lock the spur 19 and the said block 15 together. Forming part of pawl or dog 21, and projecting at its outer end exteriorly of the block 15, is a tail-piece 23 having fixed thereto at its outer or free end a laterally inwardly-extending cam-engaging member 24.

Pivotally secured, as by means of a stud-shaft 25, on the rear or inner face of one of the legs 6 of fixed member D is a bell-crank-lever 26 substantially in the form of an L having a long arm 27 and a short arm 28. At its free end, arm 27 is pivotally connected to a rod or link 29, which, in turn, has pivotal connection with an operating-lever 30 adapted to co-act with a notched sector 31 mounted on the automobile or other vehicle at a point easily accessible or convenient to the driver or operator. Short arm 28 of bell-crank lever 26 is provided at its free end with a short upward extension 32, and provided on the outer or front face of extension 32 and arm 28 is a pair of lips or short flanges 33—33. Pivoted at one end on bolt or stud-shaft 25 intermediate said leg 6 of fixed member D and said bell-crank lever 26 is a short lever-arm 34 which extends longitudinally relatively to, and projects between said lips 33—33 beyond the free end of, said short arm 28, a small coiled spring 35 being interposed and secured, for purposes hereinafter appearing, between upper lip 33 and the upper face of lever-arm 34. Extending between, and having pivotal connection with, said pin or bolt 9 and the free end of lever-arm 34 is a link 36.

Pivotally connected to, and on the rear face of, the free end of short arm 28 of bell-crank-lever 26, is an upwardly presented elongated member or bar 37 provided at its upper or free end with a widened and forwardly thickened portion or T-head 38 cut-away, as at 38ᵃ, to provide a cam-face adapted, as hereinafter more fully appearing, to successively, on the rotation of wheel C, engage and coöperate with said members 24, when pawls 21 are in locking engagement with notches 19ᶜ, to disengage the pawls 21 from the spurs 19 to permit the spurs 19 to be retracted to normal position by the springs 20. Fixed to, or preferably integrally forming part of, fixed member D, is a rearwardly or inwardly and upwardly presented arm 39 loosely connected by means of a ring or link 40 with said elongated member 37, whereby member 37, while held in operative position relatively to said fixed member D and its said arm 39, is permitted to move substantially vertically relatively to wheel C on pivotal movement of arm 28 through the operation of lever 30.

Normally, spurs 19 and their actuating means occupy the position thereof shown in full lines in Figs. 1 and 2, pawls or dogs 21 being disengaged from the spurs 19 and spurs 19 being free to be slidably projected outwardly in their said registering openings or slide-ways. When the spurs 19 are in such normal or retracted position, lever 30 occupies the position thereof shown in dotted lines in Fig. 9. Should it now be desired to project spurs 19 outwardly into ground-engaging position, or into the position thereof shown in dotted lines in Fig. 1 and in full lines in Fig. 3, lever 30 is pivotally moved to the position thereof shown in full lines in Fig. 9. On this movement of lever 30, short arm 28 of bell-crank-lever 26 will be pivotally moved upwardly, through the engagement of said link 29 with the long arm 27 of bell-crank-lever 26, this movement of short arm 28 carrying therewith lever-arm 34 and thereby, through said connecting link 36, forcing the pivotally connected inner ends of links 8—8 upwardly, or into the position thereof shown in dotted lines in Fig. 1 and full lines in Fig. 3. As the wheel C now rotates, the said inner ends of links 8—8 will successively contact or engage with the inner ends of the spurs 19 and thereby project the same in turn outwardly or into the position thereof shown in full lines in Fig. 3. Spurs 19 being so projected outwardly, the dogs 21, under the tension of their said springs 22, will engage with said spur-notches 19ᵃ and thereby releasably lock the spurs 19 and blocks 15 together, with spurs 19 in projecting or ground-engaging position. In the said pivotal movement of arm 28, said elongated member 37 will correspondingly be forced upwardly, so that, as wheel C rotates, its said cam-face 38ᵃ will be out of the annular path of travel of said laterally projecting members 24 carried by tail-pieces 23 of the dogs or pawls 21. The spurs 19 being now in projected position and yieldingly locked, as described, in ground-engaging position, operating-lever 30 is moved to its central or intermediate position, or into the position thereof shown in dot-and-dash lines in Fig. 9, whereby, through said link 29, bell-crank lever 26, and spring 25, lever-arm 34 will be moved downwardly into the position thereof shown by dot-and-dash lines in Fig. 3, this movement of lever-arm 34 carrying therewith link 36 and said links 8—8, when, is will be seen, the spurs 19 and blocks 15, to which said spurs 19 are locked by means of said pawls 21, will, while performing their function as anti-skid members for the machine or vehicle on which they may be mounted, be permitted to yield inwardly against the tension of springs 18 should the spurs 19 engage or contact with a hard roadway, rock, or other obstruction in the path of the wheel. In this intermediate movement of bell-crank lever 26, the said elongated member 37 is also moved downwardly, but this movement of member 37 is not sufficient to bring its said cam-face 38ᵃ, on the rotation or travel of wheel C, into coöperative position relatively to the said members 24. Should it, however, be desired to disengage the dogs 21 from the spurs 19, so that the spurs 19 may, under the tension of their said springs 20, be retracted to normal position, lever 30 is thrown to normal position, or to the position thereof shown in dotted lines in Fig. 9, when links 8—8, through their said connections, will be correspondingly brought to normal position, and, at the same time, said member 37 will be drawn downwardly, so that, on the rotation or travel of wheel C, cam-face 38ᵃ of member 37 will successively engage with said members 24, pawls 21 being thereby rocked against the tension of their said springs 22 out of locking engagement with the spurs 19, when said springs 20 are free to retract the spurs to normal position.

I am aware that changes in the construction, arrangement, and combination of the several parts of my new anti-skidding device may be made and substituted for those herein shown and described without departing from the nature and principle of my invention.

Having thus described my invention, what I claim and desire to secure by Letters Patent is,

1. In an anti-skidding device, the combination with a fixed member, of a rotatable wheel, a radial series of spurs slidably mounted on said wheel, resilient members for yieldingly holding said spurs in normal retracted position, spur-projecting means carried by said fixed member, said means including a pair of arcuate links pivotally connected together and to said fixed member and normally out of operative engagement with all said spurs, and means for actuating said spur-projecting means to successively, on the rotation of said wheel, engage with said spurs to project the same outwardly against the tension of said spur-holding members; substantially as described.

2. In an anti-skidding device, the combination with a fixed member, of a rotatable wheel, a radial series of spurs slidably mounted on said wheel, resilient members for yieldingly holding said spurs in normal retracted position, a pair of pivotally-connected links on said fixed member, and means for actuating said links to successively, on the rotation of said wheel, engage with said spurs to project the same outwardly against the pull of said spur-holding members, said actuating means comprising an operating-lever, a bell-crank-lever pivotally mounted on said fixed member and having pivotal connection with said operating-lever, a pivoted lever-arm adapted to be pivotally moved on the pivotal movement of said bell-crank-lever, and a link pivotally connected to said lever-arm and said pair of links; substantially as described.

3. In an anti-skidding device, the combination with a fixed member, of a rotatable wheel, a radial series of spurs slidably mounted on said wheel, resilient members for yieldingly holding said spurs in normal retracted position, spur-projecting means carried by said fixed member, an annular series of yielding members carried by said wheel, said yielding members being yieldable radially inwardly relatively to said fixed member, means for actuating said spur-projecting means to successively, on the rotation of said wheel, engage with said spurs to project the same outwardly against the tension of said spur-holding members, and means adapted to releasably lock said spurs to said yielding members when in projected position; substantially as described.

4. In an anti-skidding device, the combination with a fixed member, of a rotatable wheel, an annular series of yielding members carried by said wheel, said yielding members being yieldable radially inwardly relatively to said fixed member, spurs mounted on said wheel and normally slidable relatively to said yielding members, resilient members for yieldingly holding said spurs in normal retracted position, spur-projecting means carried by said fixed member, means for actuating said spur-projecting means to successively, on the rotation of said wheel, engage with said spurs to project the same outwardly against the tension of said spur-holding members, and means adapted to releasably lock said spurs to said yielding members when in projected position; substantially as described.

5. In an anti-skidding device, the combination with a fixed member, of a rotatable wheel, an annular series of yielding members carried by said wheel, said yielding members being yieldable radially inwardly relatively to said fixed member, a radial series of notched spurs mounted on said wheel and normally slidable relatively to said yielding members, resilient members for yieldingly holding said spurs in normal retracted position, spur-projecting means carried by said fixed member, means for actuating said spur-projecting means to successively, on the rotation of said wheel, engage with said spurs to project the same outwardly against the tension of said spur-holding members, and pivoted dogs carried by said yielding members and adapted to engage with said spurs to releasably lock the same to said yielding members when in projected position; substantially as described.

6. In an anti-skidding device, the combination with a fixed member, of a rotatable wheel, a radial series of spurs slidably mounted on said wheel, resilient members for yieldingly holding said spurs in normal retracted position, spur-projecting means carried by said fixed member, an annular series of members yieldingly carried by said wheel, said last-named members being yieldable radially inwardly relatively to said fixed member, means for actuating said spur-projecting means to successively, on the rotation of said wheel, engage with said spurs to project the same outwardly against the tension of said spur-holding members, means adapted to releasably lock said spurs to said yielding members when in projected position, and means adapted to actuate said locking means to permit said spurs to be retracted, under the pull of said holding-members, to normal position; substantially as described.

7. In an anti-skidding device, the combination with a fixed member, of a rotatable wheel, an annular series of yielding members carried by said wheel, said yielding members being yieldable radially inwardly relatively to said fixed member, spurs mounted on said wheel and normally slidable relatively to said yielding members, resilient members for yieldingly holding said spurs in normal retracted position, spur-projecting means carried by said fixed member, means for actuating said spur-projecting means to successively, on the rotation of said wheel, engage with said spurs to project the same outwardly against the tension of said spur-holding members, means adapted to releasably lock said spurs to said yielding members when in projected position, and means adapted to actuate said locking means to permit said spurs to be retracted, under the pull of said holding-members, to normal position; substantially as described.

8. In an anti-skidding device, the combination with a fixed member, of a rotatable wheel, an annular series of yielding members carried by said wheel, said yielding members being yieldable radially inwardly relatively to said fixed member, a radial series of notched spurs mounted on said wheel and normally slidable relatively to said yielding members, resilient members for yieldingly holding said spurs in normal retracted position, spur-projecting means carried by said fixed member, means for actuating said spur-projecting means to successively, on the rotation of said wheel, engage with said spurs to project the same outwardly against the tension of said spur-holding members, pivoted dogs carried by said yielding members and adapted to engage with said spurs to releasably lock the same to said yielding members when in projected position, and means adapted to disengage said pawls from said spurs to permit said spurs to be slidably retracted, under the pull of said holding-members, to normal position; substantially as described.

9. In an anti-skidding device, the combination with a fixed member, of a rotatable wheel, an annular series of yielding members carried by said wheel, said yielding members being yieldable radially inwardly relatively to said fixed member, a radial series of notched spurs mounted on said wheel and normally slidable relatively to said yielding members, resilient members for yieldingly holding said spurs in normal retracted position, spur-projecting means carried by said fixed member, means for actuating said spur-projecting means to successively, on the rotation of said wheel, engage with said spurs to project the same outwardly against the tension of said spur-holding members, pivoted dogs carried by said yielding members and adapted to engage with said spurs to releasably lock the same to said yielding members when in projected position, and means adapted to disengage said dogs from said spurs to permit said spurs to be slidably retracted, under the pull of said holding-members, to normal position, said last-named means comprising cam-engaging members carried by said dogs and a member carried by said actuating means and provided with a cam-face adapted to coöperate with said cam-engaging members; substantially as described.

10. In an anti-skidding device, the combination with a fixed member, of a rotatable wheel, a pair of fixed concentric rings carried by said wheel, said rings being spaced apart radially relatively to said fixed member, a series of radial spurs slidably mounted in said rings, resilient members for yieldingly holding said spurs in normal retracted position, spur-projecting means carried by said fixed member, and means for actuating said spur-projecting means to successively, on the rotation of said wheel, engage with said spurs to project the same outwardly against the tension of said spur-holding members; substantially as described.

11. In an anti-skidding device, the combination with a fixed member, of a rotatable wheel, an annular member fixed to said wheel adjacent the rim thereof, a second annular member concentric with, and spaced outwardly from, said first annular member, radial bolts for holding said annular members in fixed spaced-apart relation, an annular series of blocks loosely engaging at their ends with said bolts, coiled springs interposed on said bolts between said inner annular member and the ends of said blocks, a radial series of spurs slidably carried by said blocks and rings, resilient members for yieldingly holding said spurs in normal retracted position, spur-projecting means carried by fixed member, means for actuating said spur-projecting means to successively, on the rotation of said wheel, engage with said spurs to project the same outwardly against the tension of said spur-holding members, and means adapted to releasably lock said spurs to said blocks when in projected position; substantially as described.

12. In an anti-skidding device, the combination with a fixed member, of a rotatable wheel, an annular member fixed to said wheel adjacent the rim thereof, a second annular member concentric with, and spaced outwardly from, said first annular member, radial bolts for holding said annular members in fixed spaced-apart relation, an annular series of blocks loosely engaging at their ends with said bolts, coiled springs interposed on said bolts between said inner annular member and the ends of said blocks, a radial series of notched spurs slidably carried by said blocks and rings, resilient members for yieldingly holding said spurs in normal retracted position, spur-projecting means carried by fixed member, means for actuating said spur-projecting means to successively, on the rotation of said wheel, engage with said spurs to project the same outwardly against the tension of said spur-holding members, pivoted dogs carried by said blocks adapted to engage with said spurs to releasably lock said spurs to said blocks when in projected position, and means adapted to disengage said dogs from said spurs to permit said spurs to be slidably retracted, under the pull of said holding-members, to normal position; substantially as described.

13. In an anti-skidding device, the combination with a fixed member, of a rotatable wheel, an annular member fixed to said wheel adjacent the rim thereof, a second annular member concentric with, and spaced outwardly from, said first annular member, radial bolts for holding said annular members in fixed spaced-apart relation, an annular series of blocks loosely engaging at their ends with said bolts, coiled springs interposed on said bolts between said inner annular member and the ends of said blocks, a radial series of notched spurs slidably carried by said blocks and annular members, resilient members for yieldingly holding said spurs in normal retracted position, spur-projecting means carried by said fixed member, means for actuating said spur-projecting means to successively, on the rotation of said wheel, engage with said spurs to project the same outwardly against the tension of said spur-holding members, pivoted dogs carried by said blocks adapted to engage with said spurs to releasably lock said spurs to said blocks when in projected position, and means adapted to disengage said dogs from said spurs to permit said spurs to be slidably retracted, under the pull of said holding-members, to normal position, said last-named means including cam-engaging members carried by said dogs and a member pivotally connected to said actuating-means and provided with a cam-face adapted to coöperate with said cam-engaging members; substantially as described.

In testimony whereof, I have signed my name to this specification, in the presence of two subscribing witnesses.

PHILIP MAAG.

Witnesses:
 RUTH PETERSON,
 LELIA HAUK.